United States Patent Office 2,726,258
Patented Dec. 6, 1955

2,726,258

STABILIZATION OF UNSATURATED NITRILES

Carlyle J. Stehman, Decatur, Ala., assignor to Monsanto Chemical Company, St. Louis, Mo., a corporation of Delaware No Drawing. Application December 8, 1952,
Serial No. 324,846

12 Claims. (Cl. 260—465.9)

This invention relates to the stabilization of unsaturated nitriles. More specifically, this invention relates to the inhibition of the polymerization of alpha, beta-unsaturated nitriles.

The unsaturated nitriles, particularly the alpha, beta-unsaturated nitriles, are extremely useful chemical compounds. Considerable quantities of these materials are used for the preparation of synthetic rubbers and various types of synthetic resins. These materials, however, possess a characteristic which all too frequently hampers not only their utility, but also the purification techniques commonly employed in their preparation. All of these materials exhibit a tendency to polymerize when subjected to periods of storage and/or to elevated temperatures. Such polymerization results in a darkening of the unsaturated nitrile monomer and ultimately in the formation of solid polymer contaminant.

Since most applications or uses of the unsaturated nitriles require high-purity products, these polymerization characteristics present a serious problem in the preparation and storage of finished grade material. Furthermore, since distillation at elevated temperatures is the commonly used purification technique, purification is hampered by solid polymer formation which accumulates in the equipment, ultimately plugging the column. To add to this latter problem, impurities present in crude unsaturated nitriles are frequently of the type which accelerate polymerization. For example, acrylonitrile containing small quantities of acetaldehyde exhibits a greater tendency to polymerize than does relatively pure acrylonitrile.

It is an object of this invention to provide an improved method for preventing or inhibiting the polymerization of unsaturated nitriles by the addition of an inhibitor which does not possess the deficiencies exhibited by the inhibitors heretofore used. A still further object of this invention is to provide novel stabilized compositions comprising an unsaturated nitrile and an added polymerization inhibitor, which can then be subjected to extended periods of storage, or purification distillations at elevated temperatures without exhibiting any significant evidence of polymer formation. Further objects of this invention will become apparent from the description which follows.

It has been discovered that the polymerization of unsaturated nitriles, particularly the alpha, beta-unsaturated nitriles, can be prevented or inhibited by mixing therewith a minor amount of methylene blue and cuprous chloride. It has been found that a mixture of methylene blue and cuprous chloride is a significantly better polymerization inhibitor than either of the individual compounds. A composition comprising an unsaturated nitrile and a minor amount of methylene blue and cuprous chloride will not exhibit any significant polymer formation on prolonged periods of storage, or when subjected to the temperatures commonly encountered during purification distillation techniques.

The following examples illustrate, but do not limit, this invention.

*Example I*

A 500 ml. round bottom flask equipped with a thermometer, stirrer and a sample entry tube is immersed in a constant temperature water bath maintained at 35° C. 150 ml. of water is placed in the flask and nitrogen bubbled through at a slow continuous rate. 0.1560 g. of $NaHSO_3$ is then added and the mixture allowed to attain thermal equilibrium. Following this, 10 g. of acrylonitrile is added followed by 0.405 g. of $K_2S_2O_8$. This mixture of sodium bisulfite and potassium persulfate serves as a polymerization accelerator. Polymerization is allowed to continue for one hour following the end of an induction period indicated by a slight turbidity developing in the mixture. After one hour, the polymer formed is removed by filtration, washed with water and acetone and dried at 77–83° C. Approximately 8 g. of polymer is obtained, indicating a polymer yield of approximately 80% based upon acrylonitrile charged.

*Example II*

The procedure set forth in Example I is repeated with the exception that 0.068 g. of CuCl is added to the 150 ml. of water initially placed in the reaction vessel. In this case, 79% of polymer is formed.

*Example III*

The procedure set forth in Example I is repeated with the exception that 0.148 g. of CuCl is added to the 150 ml. of water initially placed in the reaction vessel. In this case, 50% of polymer is formed.

*Example IV*

The procedure set forth in Example I is repeated with the exception that 0.26 g. of methylene blue is added to the 150 ml. of water initially placed in the reaction vessel. In this case about 80% of polymer is formed.

*Example V*

The procedure set forth in Example I is repeated with the exception that 0.56 g. of methylene blue is added to the 150 ml. of water initially placed in the reaction vessel. In this case 65% of polymer is formed.

*Example VI*

The procedure set forth in Example I is repeated with the exception that 0.26 g. of methylene blue and 0.068 g. of CuCl is added to the 150 ml. of water initially placed in the reaction vessel. In this case only 44% of polymer is formed.

The preceding examples represent accelerated polymerization tests. A comparison of the polymer formation indicated in Examples I to V with the polymer formation indicated in Example VI shows the synergistic stabilizing effect of mixtures of methylene blue and cuprous chloride.

*Example VII*

Samples of acrylonitrile, methacrylonitrile, crotonitrile, α-ethylacrylonitrile, α-furfuryl acrylonitrile, α-butyl acrylonitrile, β-(2-chloroethyl) acrylonitrile, β-ethyl acrylonitrile, α-napthyl acrylonitrile, α-(2-chlorobutyl) are stabilized by mixing therewith 50 parts by weight of cuprous chloride and 50 parts by weight of methylene blue per million parts of the nitrile. After extended periods of storage of these samples at atmospheric temperatures, no significant discoloration or polymer formation is evident.

*Example VIII*

Crude acrylonitrile containing 85–90% acrylonitrile, 3–7% water, 4–8% acetaldehyde and small quantities of lactonitrile, HCN, cyanobutadiene and methyl vinyl ketone is fed at the rate of 200 ml./hr. into a packed column having 15–20 theoretical plates and operated at atmospheric pressure with an overhead temperature of 40° C., and a reboiler temperature of 78° C. Acrylonitrile is drawn off near the bottom of the column. After 124 hours of continuous operation the column is completely plugged due to polymer formation.

*Example IX*

The procedure described in Example VIII is repeated with the exception that cuprous chloride and methylene blue are continuously added to the column in an amount such that a concentration of 100 parts by weight of cuprous chloride and 100 parts by weight of methylene blue per million parts of acrylonitrile is maintained. After 543 hours of continuous operation no polymer formation in the column is evident.

While the preceding examples have illustrated specific embodiments of this invention, obviously substantial variation is possible without departing from the scope thereof. For example, the quantity of methylene blue and cuprous chloride used to inhibit the polymerization of the unsaturated nitrile can be varied widely, depending upon the particular nitrile to be stabilized and the degree of inhibition desired. In general, minor amounts of cuprous chloride and methylene blue are used—much smaller amounts than were used in the accelerated tests shown in Examples I to VI. An advantage of this mixture of inhibitors is the fact that it can be used in extremely small quantities. Concentration in the range of from about 0.5 to about 1000 parts by weight each of methylene blue and cuprous chloride per million parts of the nitrile are highly preferred. These low concentrations afford adequate stability for most applications and greatly simplify subsequent processing of the inhibited nitrile. Of course, higher concentrations of the inhibitors in the nitrile can be used if desired, resulting in a nitrile monomer even more strongly inhibited against polymerization.

This mixture of stabilizers can be used to stabilize unsaturated nitriles under any types of conditions. Thus it can be used to inhibit polymer formation in unsaturated nitriles during storage under atmospheric conditions of light, air, temperature and pressure and during purification of the crude nitrile monomer. To inhibit polymer formation during distillation of the unsaturated nitrile, the inhibitor can be added to the feed stream to the column or introduced separately at some point in the distillation column or at several points in the distillation column. For example, methylene blue can be added at the top of the column while adding cuprous chloride to the bottom of the column.

The alpha,beta-unsaturated nitriles represented by the formula

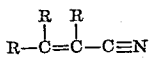

wherein the R's are the same or different and selected from the group consisting of hydrogen and alkyl radicals containing from 1 to 8 carbon atoms, respond readily to the stabilizing effect of the inhibitor mixture disclosed herein. Acrylonitrile, alpha-substituted acrylonitrile wherein the substituent on the alpha carbon atom is an alkyl radical containing from 1 to 8 carbon atoms, and beta-substituted acrylonitriles where the substituent on the beta carbon atom is an alkyl radical containing from 1 to 8 carbon atoms, represent a class of monomers which polymerize very readily, but can be most effectively inhibited against polymerization by means of this mixture of inhibitors.

When desired, separation of these inhibitors from the stabilized unsaturated nitrile monomer can be accomplished by any of a variety of simple techniques. For example, they can be extracted by means of a suitable solvent. Preferably, however, the unsaturated nitrile is distilled from the inhibited composition.

What is claimed is:
1. A composition comprising an unsaturated nitrile containing a minor amount of methylene blue and a minor amount of cuprous chloride.
2. A composition comprising an alpha,beta-unsaturated nitrile containing a minor amount of methylene blue and a minor amount of cuprous chloride.
3. A composition comprising a nitrile selected from the group consisting of acrylonitrile, the alpha-substituted acrylonitriles wherein the substituent on the alpha carbon atom is an alkyl radical containing from 1 to 8 carbon atoms, and the beta-substituted acrylonitrile wherein the substituent on the beta carbon atom is an alkyl radical containing from 1 to 8 carbon atoms, containing a minor amount of cuprous chloride and a minor amount of methylene blue.
4. A composition comprising a nitrile selected from the group consisting of acrylonitrile, the alpha-substituted acrylonitriles wherein the substituent on the alpha carbon atom is an alkyl radical containing from 1 to 8 carbon atoms, and the beta-substituted acrylonitrile wherein the substituent on the beta carbon atom is an alkyl radical containing from 1 to 8 carbon atoms, containing from about 0.5 to about 1000 parts by weight of cuprous chloride and from about 0.5 to about 1000 parts by weight of methylene blue per million parts by weight of nitrile.
5. A composition comprising acrylonitrile, from about 0.5 to about 1000 parts by weight of methylene blue and from about 0.5 to about 1000 parts by weight of cuprous chloride per million parts of acrylonitrile.
6. A process for inhibiting the polymerization of unsaturated nitriles which comprises mixing therewith a minor amount of cuprous chloride and a minor amount of methylene blue.
7. A process for inhibiting the polymerization of an alpha, beta-unsaturated nitrile which comprises mixing therewith a minor amount of cuprous chloride and a minor amount of methylene blue.
8. A process for inhibiting the polymerization of a nitrile selected from the group consisting of acrylonitrile, the alpha-substituted acrylonitrile wherein the substituent on the alpha carbon atom is an alkyl radical containing from 1 to 8 carbon atoms, and the beta-substituted acrylonitrile wherein the substituent on the beta carbon atom is an alkyl radical containing from 1 to 8 carbon atoms which comprises mixing therewith a minor amount of cuprous chloride and a minor amount of methylene blue.
9. A process for inhibiting the polymerization of a nitrile selected from the group consisting of acrylonitrile, alpha-substituted acrylonitrile wherein the substituent on the alpha carbon atom is an alkyl radical containing from 1 to 8 carbon atoms, and the beta-substituted acrylonitriles wherein the substituent on the beta carbon atom is an alkyl radical containing from 1 to 8 carbon atoms, which comprises mixing therewith from about 0.5 to 1000 parts by weight of cuprous chloride and from about 0.5 to about 1000 parts by weight of methylene blue per million parts of nitrile.
10. A process for inhibiting the polymerization of acrylonitrile which comprises mixing therewith from about 0.5 to about 1000 parts by weight of cuprous chloride and from about 0.5 to about 1000 parts by weight of methylene blue per million parts of acrylonitrile.
11. A process for inhibiting the polymerization of a nitrile selected from the group consisting of acrylonitrile, the alpha-substituted acrylonitriles wherein the substituent on the alpha carbon atom is an alkyl radical containing from 1 to 8 carbon atoms, and the beta-substituted acrylonitriles wherein the substituent on the beta carbon atom is an alkyl radical containing from 1 to 8 carbon atoms, during distillation, which comprises distilling the nitrile in the presence of a minor amount of methylene blue and a minor amount of cuprous chloride.

12. A process for inhibiting the polymerization of acrylonitrile during distillation which comprises distilling the acrylonitrile in the presence of a minor amount of methylene blue and a minor amount of cuprous chloride.

References Cited in the file of this patent

UNITED STATES PATENTS

| | | |
|---|---|---|
| 2,125,685 | Nicodemus et al. | Aug. 2, 1938 |
| 2,143,941 | Crawford | Jan. 17, 1939 |
| 2,232,785 | Houk | Feb. 25, 1941 |
| 2,445,367 | Robey et al. | July 20, 1948 |
| 2,481,080 | Castner et al. | Sept. 6, 1949 |